J. BRENZINGER.
CAN TESTING MACHINE.
APPLICATION FILED JUNE 7, 1916.

1,270,922.

Patented July 2, 1918.
5 SHEETS—SHEET 1.

Attest:

Inventor:
Julius Brenzinger,
by
Atty

J. BRENZINGER.
CAN TESTING MACHINE.
APPLICATION FILED JUNE 7, 1916.

1,270,922.

Patented July 2, 1918.
5 SHEETS—SHEET 2.

J. BRENZINGER.
CAN TESTING MACHINE.
APPLICATION FILED JUNE 7, 1916.

1,270,922.

Patented July 2, 1918.
5 SHEETS—SHEET 3.

Attest:

Inventor:
Julius Brenzinger,
by
Atty

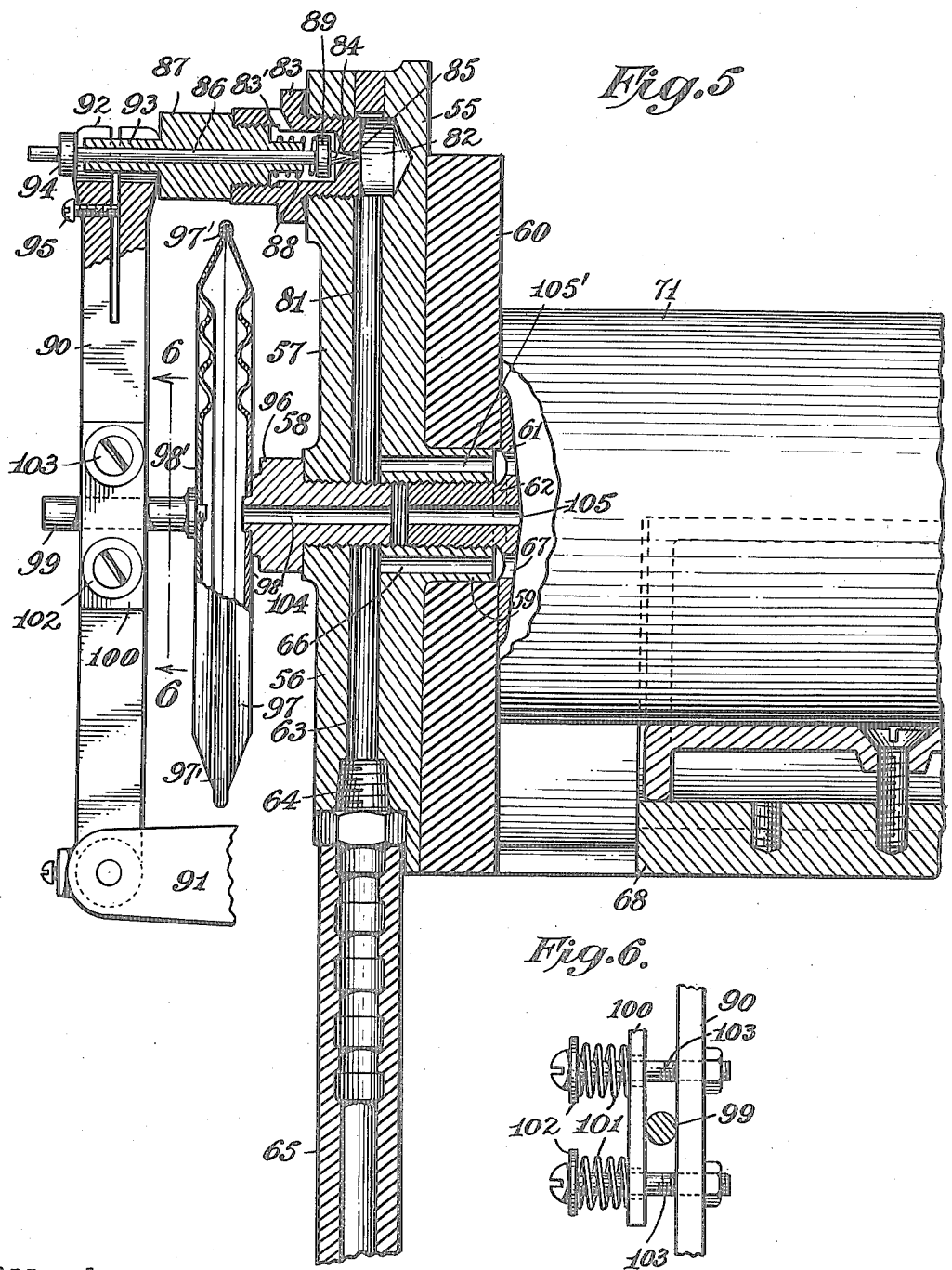

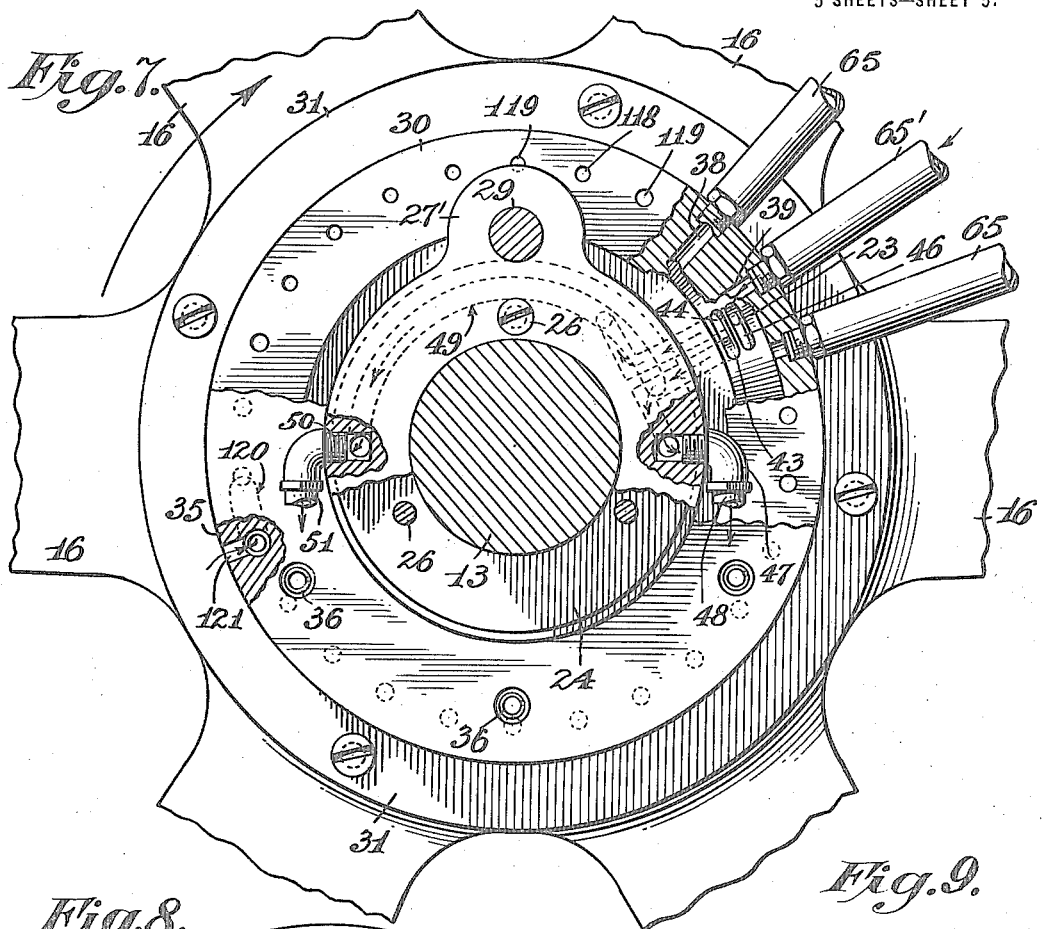
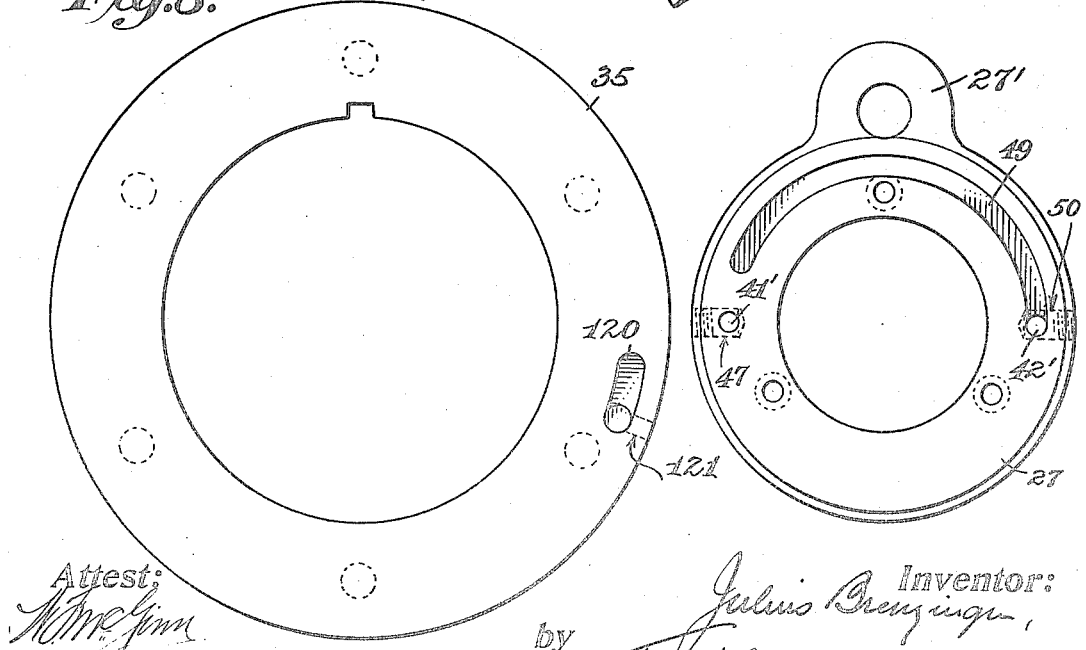

UNITED STATES PATENT OFFICE.

JULIUS BRENZINGER, OF MOUNT VERNON, NEW YORK.

CAN-TESTING MACHINE.

1,270,922.

Specification of Letters Patent.

Patented July 2, 1918.

Application filed June 7, 1916. Serial No. 102,126.

*To all whom it may concern:*

Be it known that I, JULIUS BRENZINGER, a citizen of the United States, residing at Mount Vernon, in the county of Westchester and State of New York, have invented certain new and useful Improvements in Can-Testing Machines, of which the following is a specification.

In packaging perishable food products in sheet-metal containers, commonly known as tin cans, it is essential that the containers be absolutely air-tight in order to preserve the partial vacuum which has been created in the unfilled spaces therein, and thus keep the contents free from contact with air, which has the effect of causing such contents to decompose or deteriorate. Particularly in connection with modern methods of manufacture of so-called "sanitary" cans and the production of the sheet-metal of which they are made, defects in the metal frequently give rise to leaks in some of the containers which, after they have been filled, vacuumized and sealed, permit the entrance of air with the effects heretofore suggested. The leak is usually of such minute dimensions that it is imperceptible under ordinary conditions, or at least incapable of being discovered without so prolonged and careful inspection as to curtail the output of cans to a prohibitive degree.

It has therefore been found necessary, in connection with the manufacture of cans by improved modern methods, to provide a machine for testing the manufactured can bodies for leaks prior to filling and sealing the same. This invention relates to testing machines of this character, to which the can bodies are fed and which automatically delivers the perfect bodies at one point and the imperfect or defective bodies at another.

The principal objection to many of the better known can testing machines is the necessity for running the same at comparatively slow speed, due to the time required to complete the testing and separating operations, these machines thus failing to keep pace with the output capacity of body-forming, flanging and heading machines. It will be apparent that where a testing machine is intended to constitute one of a chain of machines adapted to receive at one end thereof the sheet metal blank and discharge at the other end the filled and sealed can, it is essential that the testing machine, which forms one of the links in said chain, should have a capacity equal to that of any other machine in the chain. Therefore, the principal object of this invention is the production of a machine which may be successfully operated at comparatively high speed, and have a consequent large output capacity, without sacrifice of any other essential or desirable quality.

In addition to increase of output capacity, however, I also have in mind the contruction of a thoroughly dependable machine, comparatively simple in construction and not likely to get out of order, and one the parts of which may be readily repaired or replaced in case of breakage or excessive wear.

My invention will be more readily understood by reference to the accompanying drawings, forming a part of this specification, in which—

Fig. 5 is an enlarged section taken substantially on the line 5—5 of Fig. 3, certain parts being shown in elevation;

Fig. 6 is a detail section taken substantially on the lines 6—6 of Fig. 5;

Fig. 7 is an enlarged fragmentary sectional elevation taken substantially on the line 7—7 of Fig. 2;

Fig. 8 is a face view of the reverse side of the vacuum release ring shown in Fig. 7;

Fig. 9 is a face view of the reverse side of the end plate shown in Fig. 7;

Fig. 10 is a detail view, in perspective, of the cone sleeve hereinafter described, and Fig. 10<sup>a</sup> is a cross-section of the same.

Figure 1:
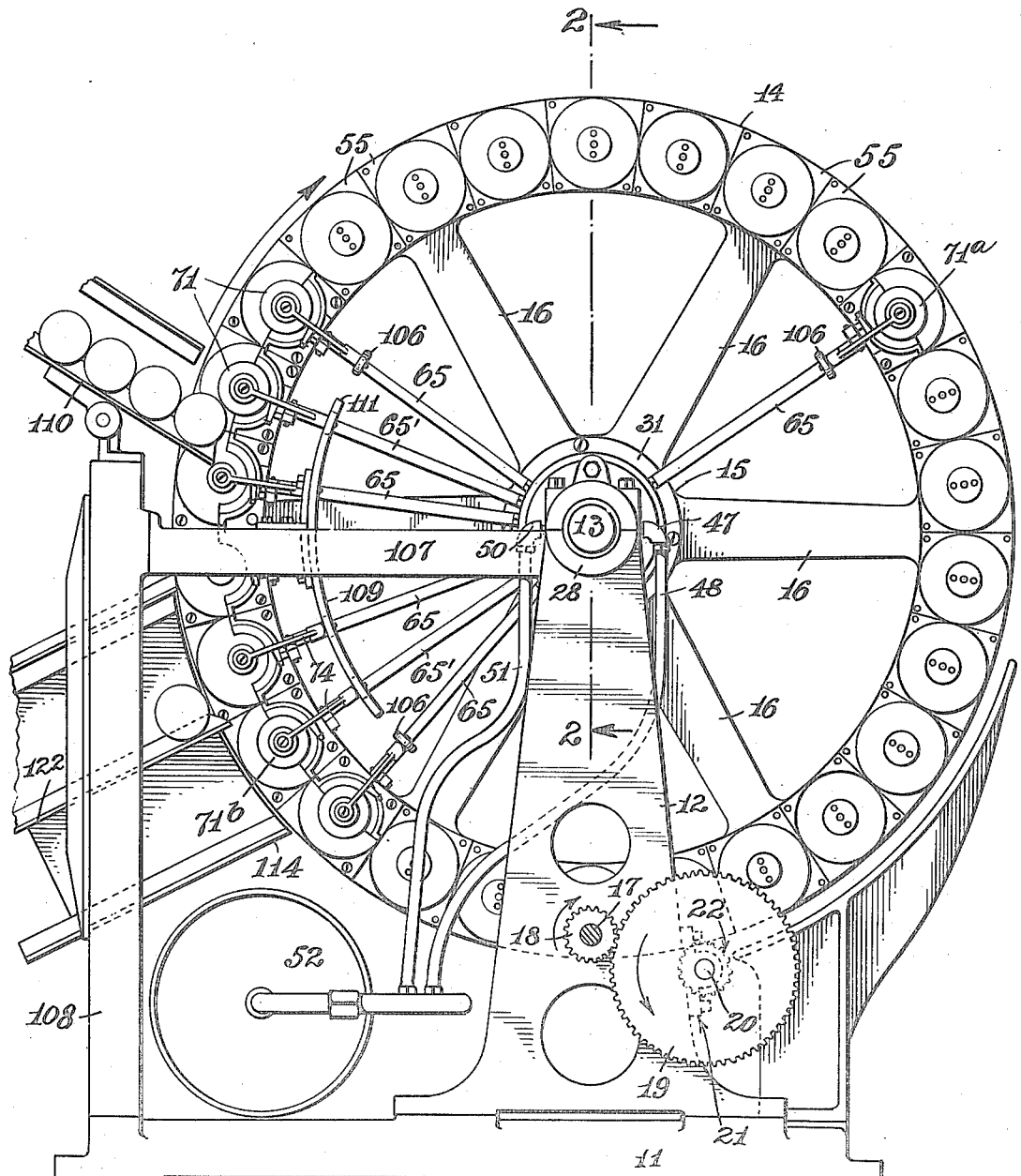
Figure 1 is a side elevation of a can-testing machine embodying my invention.

Referring now to the drawings in detail, numeral 11 designates the base of a heavy supporting frame which includes the uprights or standards 12, in the upper ends of which is journaled the axle 13 of the large cast-metal wheel 14 which has the usual hub 15, keyed to said axle 13 or otherwise fixed thereon, and the spokes 16 16.

The driving shaft 17, connected in any suitable manner with a source of power, has bearings in one of the standards 12, and is provided with a pinion 18 in mesh with a gear 19 on the shaft 20, which has bearings in extensions 21 of said standards 12. The shaft 20 carries a pinion 22 the teeth of which mesh with gear teeth 14' with which the peripheral face of the large wheel 14 is provided. It will thus be seen that this large wheel is rotated at comparatively slow velocity from the driving shaft 17.

In order to increase the capacity of the machine to the greatest possible extent, I prefer to utilize both sides of the large wheel 14 for testing purposes, and it is therefore to be understood that what may be termed a double machine is shown, comprising substantially counterpart halves, wherefore a detailed description of the parts and mechanisms on one side thereof will suffice for those on the other.

Surrounding the axle 13, adjacent to and impinging against the hub 15, are the preferably hollow cone sleeves 23, each being provided with a threaded cylindrical end portion 24 to receive the interiorly threaded retaining ring or gland nut 25.

Each of these cone sleeves is held against rotation by screws 26, passing through what I term the end plate 27 which, in turn, is secured to the axle bearing 28 at the upper end of the standard 12 by a bolt 29 passing through said bearing and through the boss 27' on said plate 27.

Fitting and rotatable on each of these cone sleeves 23 is what I may term a distributing collar 30 which is provided with an annular flange 31, whereby the same may be screwed to the annular flange 32, carried by the spokes 16 of the wheel 14, for rotation therewith. The flanges 32 are preferably provided with orifices 33 to afford access to the set-screws 34.

At the end of the distributing collar 30, I provide what I shall term a vacuum release ring 35, held snugly against the end face of said collar by means of springs 36 interposed between said ring 35 and the ring 37, both of said rings being keyed to the cone sleeve 23 and said ring 37 being adjustably retained in place by the gland nut 25. This distributing collar 30 is provided with a plurality of radially-disposed ducts 38, alternating with a series of similar ducts 39, these ducts extending through the collar from the face of the cone sleeve 23. These ducts are shown in staggered arrangement because, on account of the large number thereof, they would be too close together for proper operation of the machine if alined. As will be hereinafter described in detail, the can bodies being tested are carried in close proximity to each other near the periphery of the wheel, and there are as many of the ducts 38 and 39 on each side of the wheel as there are can-carrying mechanisms on each side of the periphery thereof. As a partial vacuum is created in each can body in turn through the ducts 38 or 39, as each thereof during rotation of the collar 30 passes a certain port in the stationary cone sleeve 23, it will be apparent that a slight period of time is required to exhaust the air from the can to a suitable degree, and in order to provide for this time element these ducts are in staggered arrangement, whereby the port of each thereof will clear the registering port in the cone sleeve before the next in turn reaches the exhaust port, all as will be hereinafter made clear.

If the cone-sleeve 23 is cored or hollow, as shown, a mass of metal 40 is left on one side of the interior thereof in which to provide two longitudinal bores 41 and 42, the bore 41 leading to a radially-disposed extension 43 thereof which terminates in a short circumferential groove or channel 44 in the face of said cone-sleeve, said groove or channel being so located as to register with the ducts or bores 38 in the distributing collar 30. The bore 42 leads to a similar radially-disposed duct or bore 45 which terminates in a similar short circumferential groove or channel 46 in the face of said cone-sleeve, said groove or channel 46 being located to register with the ducts or bores 39 in said collar 30.

The other ends of the ducts or bores 41 and 42 lead to the end plate 27, which is provided with a bore 41' registering with the end of the bore 41 and leading through the connection 47 to the pipe 48. The end of the duct or bore 42 is open to the circular groove or channel 49 in the face of the plate 27, the other end of which leads to the bore 42' which is open through the connection 50 to the pipe 51. The pipes 48 and 51 have joint connection with and are constantly open to a suitable vacuum tank 52.

Figure 3:
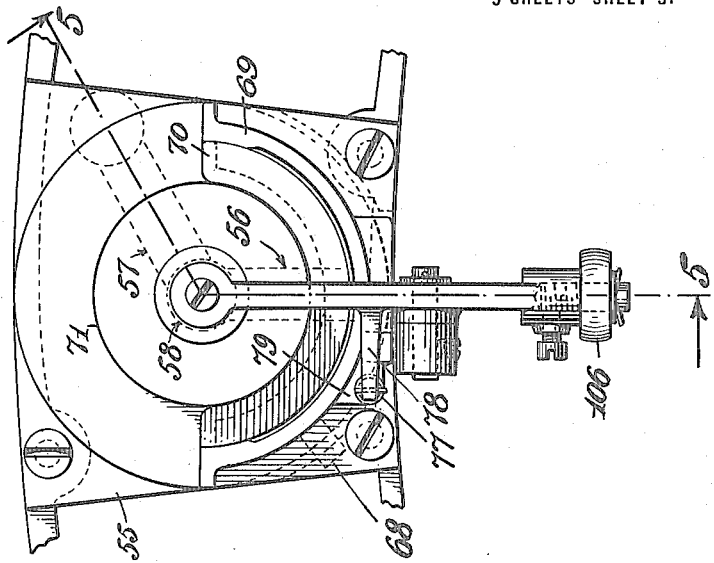
Fig. 3 is an enlarged face view of a segment of the large wheel shown in Fig. 1, with the can body in position under action of the mechanical holding means.
Figure 4:
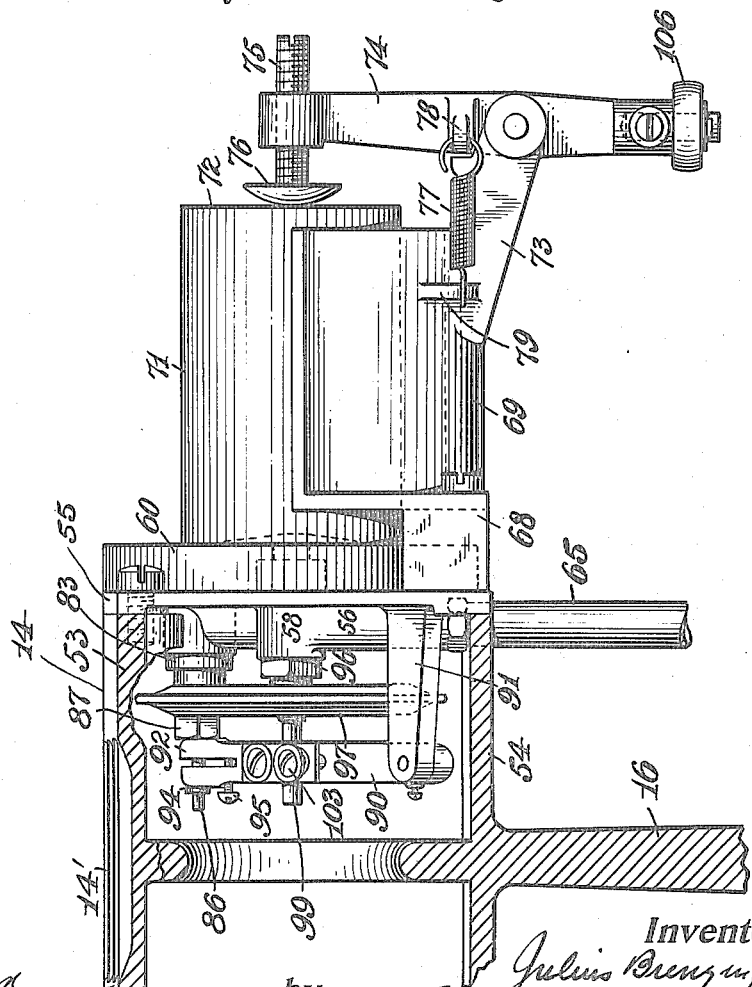
Fig. 4 is a side view of Fig. 3.

At the ends of the spokes 16 are provided the outer double flange or rim 53 and the inner double flange 54. To the end edges of these flanges, on each side of the wheel 14, is secured a series of plates 55 each of which is preferably a casting which includes the radially-disposed ribs 56 and 57 which meet and form an angle at the central boss 58, as shown in Fig. 4 and by the dotted lines in Fig. 3. This plate 55 is also provided, on the outer side thereof, with the boss 59 upon which is mounted a disk 60 of yieldingly elastic material, such as soft rubber, this disk being held in place by means of a cap 61 having a shank 62 screw-threaded into said boss 59, as shown in Fig. 5, and providing a yieldingly elastic seat for the open end of a can body against which said body may be pressed to form a hermetic connection.

Figure 2:
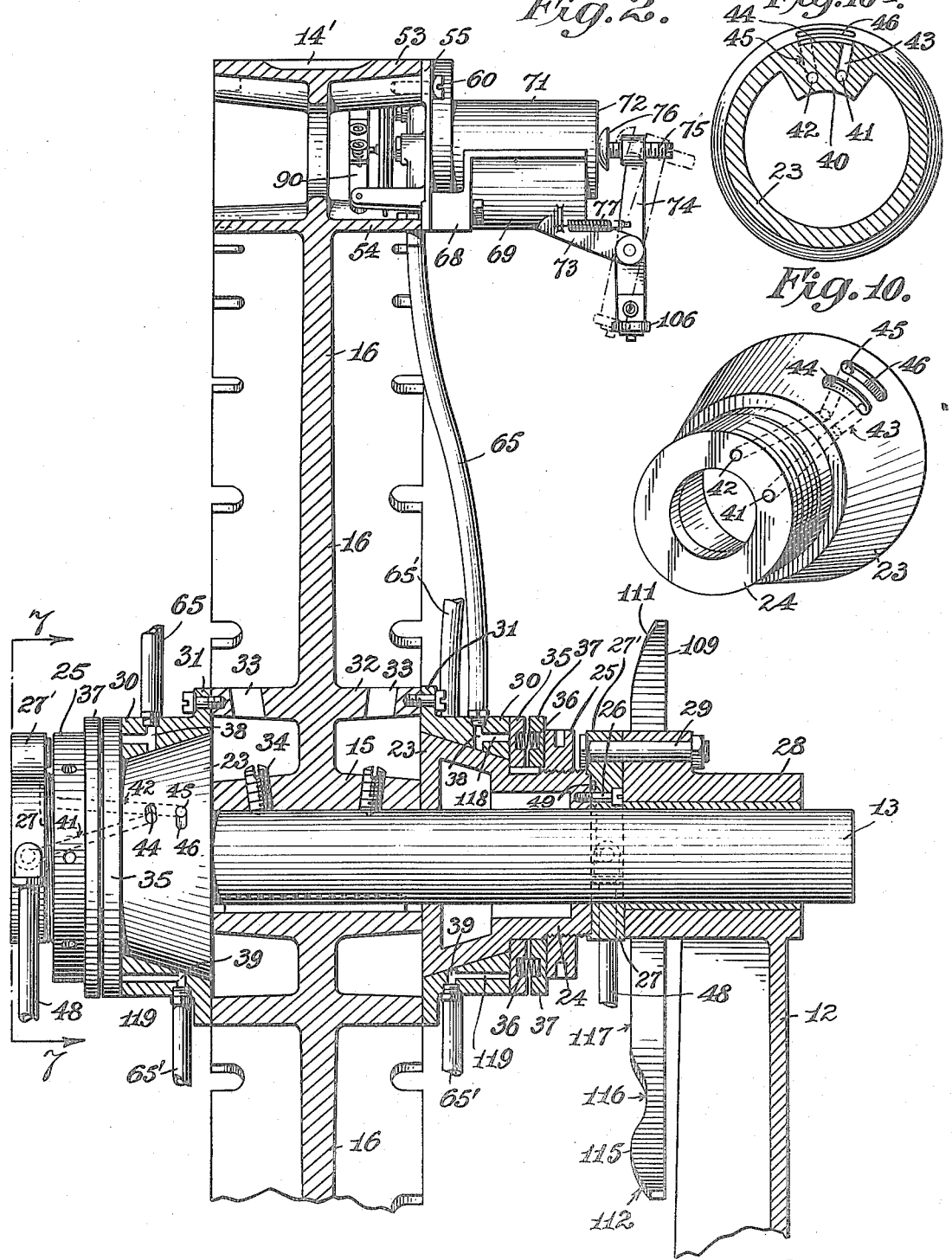
Fig. 2 is an enlarged fragmentary transverse section, partly in elevation, taken substantially on the line 2—2 of Fig. 1.

The rib 56 is provided with a longitudinal bore 63 leading through the connection 64 to one of the pipes 65 which leads through a suitable connection to one of the ducts 38 or 39, the pipe 65 shown in Figs. 2, 4 and 5 leading to one of the ducts 38, and each alternate pipe, such as one of the pipes 65' (Figs. 1 and 7), leading to one of the ducts 39.

From the bore or duct 63 in the rib 56, leads a lateral duct 66, the end of which registers with an orifice 67 in the cap 61 and which is thus open to the interior of a can body pressed against the seat 60.

Screwed or bolted to the outer face of the plate 55 is the casting 68 which includes a semi-cylindrical portion 69 adapted to receive and support a can body and the dimensions of which approximate those of the largest size of can which a machine embodying my invention is adapted to test. When testing cans of smaller size, a supplemental semi-cylindrical member 70 may be suitably secured within the receptacle 69, nesting therein, as shown in Fig. 3, which is adapted to fit and carry a can body 71 of relatively smaller size. This can body 71 is one of those in process of being tested, and is headed at the end 72 thereof, the other end being open and seated against the yielding disk 60.

The casting 68 also includes an arm 73 at the end of which is fulcrumed the lever 74. An adjustable screw 75 is carried at one end of this lever, said screw being provided with a head 76 so located as to normally impinge against the end 72 of the can 71. A coil-spring 77, in tension between a lug 78 on said lever and a lug 79 on the casting 68, tends to yieldingly press the head 76 of the screw 75 against the end 72 of the can 71 to hold the latter firmly and hermetically against the yielding seat which is provided by the disk 60.

Referring now more particularly to the parts shown in Fig. 2, it will be apparent that when the duct 39 in the distributing collar 30 reaches the short channel or groove 46 in the cone-sleeve 23, an open passage will be provided from the vacuum tank 52, through the pipe 51, the circular channel 49 in the end plate 27, the ducts 42 and 45 to said duct 39, thence through the pipe 65' and the bores 63 and 66 to the interior of the can body 71. In this manner, at a certain point in the revolution of the wheel 14, a partial vacuum will be created within the can body 71, and if the can is perfect—that is to say, has no leaks—the can-body will be firmly pressed against the yielding seat 60 by the exterior air pressure. It will be apparent that a partial vacuum will be created in each can-body in turn at the desired point in the revolution of the wheel 14, the air from alternate can-bodies being similarly exhausted through the ducts 38, which establish communication between the vacuum-tank 52 and the can-body in the same manner and under the same conditions as this connection is established through the ducts 38, except that in this case exhaustion is through the ducts 41' and 47 in the end-plate 27 instead of through the circular groove or channel 49 therein.

The rib 57 is provided with a longitudinal bore 81, leading to a small chamber 82 near the end thereof which is sealed by means of the screw-threaded plug 83. Within this plug 83 a needle-valve 84 normally closes the small duct 85 leading from the atmosphere through the duct 83' into said chamber 82. This valve is provided with an elongated stem 86 slidable in the block 87 which is screwed to the plug 83, and said valve 84 is normally retained in a closed condition by means of the coil-spring 88 in compression between a shoulder on said plug 87 and a fixed collar 89 on said valve-stem 86.

A lever 90 is fulcrumed at one end thereof in the arm 91 carried by the plate 55, the other end of said lever being provided with a head 92 embracing and movable longitudinally of the reduced extension 93 of the plug 87. The valve-stem 86 passes through said extension 93 and the head 92, a fixed collar 94 being mounted on said stem contiguous to the head 92, and against this collar the end of said lever 90 impinges to move said stem and unseat the needle-valve 84 at the inner end thereof. To effect a nicety of adjustment, I split the end of said lever 90 and provide an adjusting-screw 95 by means of which head 92 may be expanded to effect a delicately balanced connection and insure movement of said stem 86 with minute initial movement of the free end of said lever 90.

Screw-threaded into the boss 58 at the intersection of the ribs 56 and 57, is a plug 96, to the end of which is secured the diaphragm-box 97. This plug is provided with a central bore 104, opening at one end into said diaphragm-box or casing 98 and at the other end to a central bore 105 through the shank 62 and the cap 61, and is thus open to the interior of the can-body seated against the pad or disk 60.

The diaphragm-box 97 preferably comprises two thin disks 98 and 98' of pliable sheet-metal, said disks having in-turned edges which are hermetically sealed together by the ring 97' which is U-shaped in cross-sectional configuration and snugly embraces said edges, and preferably through the employment of solder or other self-hardening binding or sealing material, forms a seam between said disks and provides an air-tight chamber therebetween. Each of these disks is preferably provided with a series of annular corrugations, as shown, to give stiffness and a higher degree of resiliency to the side walls of the box. To the middle of the disk 98', forming the side wall of the box opposite the side secured to the plug 96, is fastened a stem 99 which is preferably yieldingly engaged by the lever 90, at substantially the middle of the latter, by a plate 100 (Fig. 6) adapted to clamp said stem between said lever 90 and said plate 100 by coil-springs 101 in compression between washers 102 on the screw-bolts 103 and said plate, said bolts being screwed through the lever 90 and the plate 100 being slidable thereon.

The object of this frictional connection between the stem 99 and the lever 90 is to insure movement of the valve-stem 86 upon initial movement of the lever 90 irrespective of the extent of distortion of the diaphragm-box in various conditions under varying degrees of unequal air pressures. The more nearly perfect the vacuum in the can body 71, the greater distortion of the walls of the diaphragm-box or the greater the forces tending to effect such distortion. If a rigid connection existed between the stem 99 and the lever 90, the creation of a vacuum of high degree within the can body would generate distorting forces of such magnitude that a gradual equalization of air pressures, due to a very minute leak in the can body, would not immediately result in movement of the disk 98', and cause the operation of the needle-valve 84 in opening the passage 85 to be delayed for too long a period of time. However, it will be apparent that through the employment of the frictional connection shown and described, if the distorting forces are continued after inward movement of the lever 90 has been checked by the head 92 of said lever impinging against the shoulder on the plug 87, these forces will overcome the frictional resistance of the plate 100 and the lever 90 to movement of the stem 99 and said stem will slide therebetween until a balance of forces is established. Under conditions, the leakage into can body 71 of even a very small amount of air will at once destroy this balance and the tendency of the diaphragm-box to return to its original form will effect immediate movement therewith of the lever 90 and the consequent opening of the valve 84, thereby opening a passage from the atmosphere to the interior of the can-body through the duct 83', the hollow plug 83, the duct 85, the chamber 82, the bore 81 and the cross-bore 105'—the latter connecting the bore 81 with the interior of the can body 71 in the same manner as the cross-bore 66 connects the bore 63 with the interior of said can body—and equalizing interior and exterior air pressures.

At the inner end of each of the levers 74 is mounted a roller 106, and carried by the cross-bar 107 mounted at the upper ends of the standard 12 and the standard or upright 108, is the circular cam-plate 109, so disposed with reference to the center of the wheel as to provide a track in the path of movement of the rollers 106. The major portiton 117 of this track is rectilinear, and while each of the rollers 106 is passing thereover the lever 74 with its presser-head 76 is moved from the position shown in solid lines in Fig. 2 to the position shown in broken lines in said figure, thereby removing the presser-head 76 from the position in which it yieldingly presses against the outer end of the can-body 71, to a position in which said head is clear thereof.

The open ended can-bodies 71 are preferably delivered to the machine through an inclined chute 110, these can bodies being advanced by gravity and successively falling into the receptacles provided by the parts 69 and 70 as these parts pass the delivery end of said chute, said receptacles being at this point so disposed as to receive and retain said bodies. The cam-plate 109 and the chute 110 are so relatively arranged that a can body is delivered to a receptacle therefor in the wheel 14 while the presser-head 76 on the lever 74 is held away from its normal spring-pressed position during travel of the roller 106 along the major rectilinear portion 117 of said cam-plate. What may be termed the rear end of this cam-plate 109 is provided with a tapered or curved face 111, which permits the lever 74 to be gradually returned under action of the spring 77 to position where the can body is firmly and hermetically pressed against the yielding seat 60 by the presser-head 76.

The can body 71ª (Fig. 1) has reached a point in the revolution thereof with the wheel 14 where an open passage has been provided, through the pipe 65, the distributing head 30, the cone-sleeve 23, the end-plate 27 and the pipe 51, to the vacuum-tank 52. Therefore, at this point a partial vacuum is created within the can body 71ª (and within the correspondingly positioned can body on the other side of the wheel), the degree of vacuumizing being sufficient to cause the exterior air pressure to hold said can body firmly and hermetically against the yielding pad or seat 60, although for the time being the can body remains under the pressure of the presser-head 76 in order that said body may not be prematurely released by equalization of the air pressures within and without said body due to leaks in said body or imperforations in the seam between the side portion of said body and the end 72 thereof.

This condition prevails until the can body has been revolved by the wheel through an arc which brings the roller 106 to the tapering face 112 at the other end of the cam-plate 109. This tapering or curved face 112 of said cam-plate effects, through engagement of the roller 106 therewith, movement of the lever 74 against the action of the spring 77 to withdraw the presser-head 76 from the end of the cam-body, which is then held against release under action of gravity by the exterior air pressure only, as explained.

If, now, the can body—which I now designate 71$^b$, (Fig. 1)—is leaky, due to imperfections in the sheet metal of which it is constructed or imperfections in the seam between the side and end portions thereof, sufficient time will have elapsed between the creation of the partial vacuum therein and withdrawal of the presser-head 76 to permit of disturbances of the balance of forces which have retained the diaphragm-box 97 in its distorted condition, initial movement of the disk 98' operating through the lever 90 to open the valve 84 and equalize the air pressures within and without the can body 71, as explained. Therefore, said can body, having been released from its mechanical pressing and retaining means, through deflection of the roller 106 by the cam 115, and said can body now being released from the air pressure which has heretofore held said body on its seat 60, said can body will drop under action of gravity into the inclined chute 114, carried by the upright 108, for delivery with other "bad cans" in some suitable receptacle or at some desired point.

Just beyond the cam 115 on said cam-plate 109, which has served to effect withdrawal of the presser-head 76 and permit the discharge of a leaky can-body, a recess 116 is provided in said cam-plate, permitting the return of said presser-head 76 against the can-body to hold the latter temporarily and prevent disengagement thereof through premature equalization of the air pressures to release the "good cans". During this interval, the wheel has continued its revolution to carry the roller 106 to the major rectilinear face 117 of said cam-plate 109, again withdrawing the presser-head 76 from the end of the can-body to permit release of the latter upon restoration of the condition of equal pressures. To effect this condition of equal pressures, I provide in the distributing collar 30 a series of ducts 118 leading from the ducts 38 to the outer end face of said collar, and a series of ducts 119 similarly connecting the ducts 39 with the outer end face of said collar. The vacuum release ring 35—which, as has been explained, is spring-pressed against the end face of the collar 30 and normally closes the ducts 118 and 119—is provided with a short groove or channel 120 open through a short duct 121 to the atmosphere. This channel 120 is so located in the vacuum release ring 35 as to be reached by the ends of each of said ducts 118 and 119, in turn, just following the displacement of the lever 74 when the roller 106 reaches the rectilinear face 117 of the cam-plate 109. At this point, the wheel 14 has advanced the can body to position where the same, upon release and under action of gravity, will fall into the chute 122 for delivery into a suitable receptacle for "good cans" or for collection at such point as may be desired.

It is not to be overlooked that I have confined this description largely to one of the two counterpart halves of the machine—that is to say, it is to be understood that I utilize both sides of the wheel 14 for testing purposes—and that the foregoing description, in so far as the same relates to one side only of the wheel 14, is to be taken as a description of corresponding parts and mechanisms on the other side thereof.

In connection with the present invention, attention is directed to the fact that by the staggered arrangement of the ducts 38 and 39, and the connections between said ducts and the vacuum-chamber and the atmosphere, respectively, I am enabled to locate the can-carrying mechanisms at the periphery of said wheel in much closer proximity to each other than would otherwise be possible, thereby materially increasing the capacity output of the machine. Furthermore, through the employment of a wheel of comparatively large diameter, and still being able to locate the can-carrying mechanisms as close together on the periphery of said wheel as the dimensions of said mechanisms will permit, I provide ample time between the exhaust of air from each container in turn and the release of the mechanical holding means to permit of reduction of the air pressure against the diaphragm, through entrance of even a small amount of air pressure through a leak or leaks of the most minute size in the can-body and thus release said body through complete restoration of the condition of equal air pressures, without curtailing the speed at which the machine may be operated, and, therefore, without diminishing a desired large output capacity of the machine. Furthermore, it will be noted that in the entire machine there is but one valve—in the more limited and restricted sense in which this term is understood—thereby reducing to a minimum the number of elements which are most likely to give trouble, through the accumulation of small particles of solid foreign matter in the valve seats and thus necessitate frequent removal for repair or replacement. Furthermore, it will be seen that the machine is entirely automatic, requiring the attendance of but one unskilled operative to feed the untested can-bodies into the chute 110, the "bad cans" and the "good cans" being automatically separated and separately discharged and delivered at different points. Still, furthermore, it will be apparent that the machine described is comparatively simple in construction and dependable in operation.

Many modifications of minor details of my improved can-testing machine, as shown and described, will doubtless readily suggest themselves to those skilled in the art to which it appertains, and I therefore do not desire to limit my invention to the specific construction herein shown and described.

I claim as new and desire to secure by Letters Patent:

1. In a can testing machine, the combination, with a continuously revolving wheel having mounted on each side and near the periphery thereof means for progressively advancing a plurality of open-ended can bodies, each of said means including a series of yieldingly elastic seats and a corresponding series of mechanisms for pressing the open end of each can body against and retaining the same upon its seat, of means for exhausting air from the interior of can bodies on both sides of said wheel at a fixed point in the orbit of revolution thereof, said exhausting means including a common primary source of air exhaustion, means subsequently operable to successively release said can bodies from their pressing and retaining mechanism, and means for restoring equilibrium of air pressures within and without each can body after appreciable further movement thereof and while in such condition of release.

2. In a can testing machine, the combination, with means for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to first release each of said can bodies in turn from said pressing and retaining mechanism, then again render said mechanism effectively operative, and finally again release said body, and means for restoring equilibrium of air pressures within and without each can body after appreciable further movement thereof during the second period of release.

3. In a can testing machine, the combination, with means traveling in an endless path for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to first release each of said can bodies in turn from its pressing and retaining mechanism, then again render said mechanism effectively operative, and finally again release said body, and means for restoring equilibrium of air pressures within and without each can body after appreciable further movement thereof during the second period of release.

4. In a can testing machine, the combination, with a revolving wheel having mounted thereon near the periphery thereof a circularly arranged series of yieldingly elastic seats and a corresponding series of mechanisms for pressing the open end of each can body against and retaining the same upon its seat, of means for exhausting air from the interior of each can body in turn at a fixed point in the orbit of revolution of said wheel, means subsequently operable to first release each of said can bodies in turn from its pressing and retaining mechanism, then again render said mechanism effectively operative, and finally again release said body, and means for restoring equilibrium of air pressures within and without each can body after appreciable further movement thereof during the second period of release.

5. In a can testing machine, the combination, with a moving carrier having on each side thereof means for progressively advancing a plurality of open-ended can bodies, each of said means including a series of yieldingly elastic seats and a corresponding series of mechanisms for pressing the open end of each can body against and retaining the same upon its seat, of means for exhausting air from the interior of can bodies on both sides of said carrier at a fixed point in the path of movement of said carrier, said exhausting means including a common primary source of air exhaustion, means subsequently operable to first successively release can bodies from their pressing and retaining mechanisms, then restore effective operation of said mechanisms, and finally again release said bodies, and means for restoring equilibrium of air pressures within and without each can body after appreciable further movement thereof during the second period of release.

6. In a can testing machine, the combination, with a continuously moving carrier traveling in an endless path and having mounted on each side thereof a series of yieldingly elastic seats and a corresponding series of mechanisms for pressing the open end of each can body against and retaining the same upon its seat, of means for exhausting air from the interior of can bodies on both sides of said carrier at a fixed point in the path of movement of said carrier, said exhausting means including a common primary source of air exhaustion, means subsequently operable to first successively release can bodies from their pressing and retaining mechanisms, then restore effective operation of said mechanisms, and finally again release said bodies, and means for restoring equilibrium of air pressures within and without each can body after appreciable further movement thereof during the second period of release.

7. In a can testing machine, the combination, with a revolving wheel having mounted on each side and near the periphery thereof a circularly arranged series of yieldingly elastic seats and a corresponding series of mechanisms for pressing the open end of each can body against and retaining the same upon its seat, of means for exhausting air from the interior of can bodies on both sides of said carrier, at a fixed point in the orbit of revolution of said wheel, said exhausting means including a common primary source of air exhaustion, means subsequently operable to first successively release can bodies from their pressing and retaining mechanisms, then restore effective operation of said mechanisms, and finally again release said bodies, and means for restoring equilibrium of air pressures within and without each can body after appreciable further movement thereof during the second period of release.

8. In a can testing machine, the combination, with means for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to release each of said bodies in turn from said pressing and retaining mechanism, mechanical means pneumatically actuated during such condition of release by variance in the initial ratio of air pressures within and without said body to restore an equilibrium of said air pressures, and additional means subsequently operable to restore said equilibrium during such condition of release if said ratio of air pressures has not been previously disturbed.

9. In a can testing machine, the combination, with means traveling in an endless path for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to release each of said bodies in turn from said pressing and retaining mechanism, mechanical means pneumatically actuated during such condition of release by variance in the initial ratio of air pressures within and without said body to restore an equilibrium of said air pressures, and additional means subsequently operable to restore said equilibrium during such condition of release if said ratio of said pressures has not been previously disturbed.

10. In a can testing machine, the combination, with a revolving wheel having mounted thereon near the periphery thereof a circularly arranged series of yieldingly elastic seats and a corresponding series of mechanisms for pressing the open end of each can body against and retaining the same upon its seat, of means for exhausting air from the interior of each can body in turn at a fixed point in the orbit of revolution of said wheel, means subsequently operable to release each of said bodies in turn from its pressing and retaining mechanism, mechanical means pneumatically actuated during such condition of release by variance in the initial ratio of air pressures within and without said body to restore an equilibrium of said air pressures, and additional means subsequently operable to restore said equilibrium during such condition of release if said ratio of said pressures has not been previously disturbed.

11. In a can testing machine, the combination, with a moving carrier having on each side thereof means for progressively advancing a plurality of open-ended can bodies, each of said means including a series of yieldingly elastic seats and a corresponding series of mechanisms for pressing the open end of each can body against and retaining the same upon its seat, of means for successively exhausting air from the interior of can bodies on both sides of said carrier at a fixed point in the path of movement of said carrier, said exhausting means including a common primary source of air exhaustion, means subsequently operable to first successively release said bodies from their pressing and retaining mechanisms, mechanical means pneumatically actuated during such condition of release by variance in the initial ratio of air pressures within and without said body to restore an equilibrium of said air pressures, and additional means subsequently operable to restore said equilibrium during such condition of release if said ratio of air pressures has not been previously disturbed.

12. In a can testing machine, the combination, with a continuously moving carrier traveling in an endless path and provided on each side thereof with means for progressively advancing a plurality of open-ended can bodies therewith, each of said means including a series of yieldingly elastic seats and a corresponding series of mechanisms for pressing the open end of each can body against and retaining the same upon its seat, of means for successively exhausting air from the interior of can bodies on both sides of said carrier at a fixed point in the path of movement of said carrier, said exhausting means including a common primary source of air exhaustion, means subsequently operable to successively release said bodies from their pressing and retaining mechanisms, mechanical means pneumatically actuated during such condition of release by variance in the initial ratio of air pressures within and without said body to restore an equilibrium of said air pressures, and additional means subsequently operable to restore said equilibrium during such condition of release if said ratio of air pressures has not been previously disturbed.

13. In a can testing machine, the combination, with a continuously revolving wheel having mounted on each side and near the periphery thereof means for progressively advancing a plurality of open-ended can bodies, each of said means including a series of yieldingly elastic seats and a corresponding series of mechanisms for pressing the open end of each can body against and retaining the same upon its seat, of means for successively exhausting air from the interior of can bodies on both sides of said wheel at a fixed point in the orbit of revolution of said wheel, said exhausting means including a common primary source of air exhaustion, means subsequently operable to successively release said bodies in turn from their pressing and retaining mechanisms, mechanical means pneumatically actuated during such condition of release by variance in the initial ratio of air pressures within and without said body to restore an equilibrium of said air pressures, and additional means subsequently operable to restore said equilibrium during such condition of release if said ratio of air pressures has not been previously disturbed.

14. In a can testing machine, the combination, with means for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to first release each of said can bodies in turn from its pressing and retaining mechanism, then again render said mechanism effectively operative, and finally again release said body, mechanical means pneumatically actuated during the first period of release by and upon variance in the initial ratio of air pressures within and without said body to restore an equilibrium of said air pressures, and means subsequently operable to restore said equilibrium during the second period of release if said ratio of air pressures has not been previously disturbed.

15. In a can testing machine, the combination, with means traveling in an endless path for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to first release each of said can bodies in turn from its pressing and retaining mechanism, then again render said mechanism effectively operative, and finally again release said body, mechanical means pneumatically actuated during the first period of release by and upon variance in the initial ratio of air pressures within and without said body to restore an equilibrium of said air pressures, and means subsequently operable to restore said equilibrium during the second period of release if said ratio of air pressures has not been previously disturbed.

16. In a can testing machine, the combination, with a revolving wheel having mounted thereon near the periphery thereof a circularly arranged series of yieldingly elastic seats and a corresponding series of mechanisms for pressing the open end of each can body against and retaining the same upon its seat, of means for exhausting air from the interior of each can body in turn at a fixed point in the orbit of revolution of said wheel, means subsequently operable to first release each of said can bodies in turn from its pressing and retaining mechanism, then again render said mechanism effectively operative, and finally again release said body, mechanical means pneumatically actuated during the first period of release by variance in the initial ratio of air pressures within and without said body to restore an equilibrium of said air pressures, and means subsequently operable to restore said equilibrium during the second period of release if said ratio of air pressures has not been previously disturbed.

17. In a can testing machine, the combination, with a moving carrier having on each side thereof means for progressively advancing a plurality of open-ended can bodies, each of said means including a series of yieldingly elastic seats and a corresponding series of mechanisms for pressing the open end of each can body against and retaining the same upon its seat, of means for successively exhausting air from the interior of can bodies on both sides of said carrier at a fixed point in the path of movement of said carrier, means subsequently operable to first successively release can bodies from their pressing and retaining mechanisms, then restore effective operation of said mechanisms, and finally again release said bodies, mechanical means pneumatically actuated during the first period of release by and upon variance in the initial ratio of air pressures within and without each of said bodies to restore an equilibrium of said air pressures, and means for restoring said equilibrium during the second period of release if said ratio of air pressures has not been previously disturbed.

18. In a can testing machine, the combination, with a continuously moving carrier traveling in an endless path and having mounted on each side thereof a series of yieldingly elastic seats and a corresponding series of mechanisms for pressing the open end of each can body against and retaining the same upon its seat, of means for successively exhausting air from the interior of can bodies on both sides of said carrier, at a fixed point in the path of movement of said carrier, means subsequently operable to first successively release can bodies from their pressing and retaining mechanisms, then restore effective operation of said mechanisms, and finally again release said bodies, mechanical means pneumatically actuated during the first period of release by and upon variance in the initial ratio of air pressures within and without each of said bodies to restore an equilibrium of said air pressures, and means subsequently operable to restore said equilibrium during the second period of release if said ratio of air pressures has not been previously disturbed.

19. In a can testing machine, the combination, with a revolving wheel having mounted on each side and near the periphery thereof a circularly arranged series of yieldingly elastic seats and a corresponding series of mechanisms for pressing the open end of each can body against and retaining the same upon its seat, of means for exhausting air from the interior of can bodies on both sides of said wheel at a fixed point in the orbit of revolution thereof, means subsequently operable to first successively release can bodies from their pressing and retaining mechanisms, then restore effective operation of said mechanisms, and finally again release said bodies, mechanical means pneumatically actuated during the first period of release by and upon variance in the initial ratio of air pressures within and without each of said bodies to restore an equilibrium of said air pressures, and means subsequently operable to restore said equilibrium during the second period of release if said ratio of air pressures has not been previously disturbed.

20. In a can testing machine, the combination, with means for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to release each of said can bodies in turn from its pressing and retaining mechanism, means providing a passage from the atmosphere to the interior of each seated can body, a valve in said passage, means open to the interior of each can body and actuated by the external air pressure to close said valve and retain the same in a closed condition while the degree of said air pressure is maintained, and means for restoring equilibrium of air pressures within and without each can body after appreciable further movement thereof in condition of mechanical release.

21. In a can testing machine, the combination, with means for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to release each of said can bodies in turn from its pressing and retaining mechanism, means providing a passage from the atmosphere to the interior of each seated can body, a valve in said passage, a hollow member open to the interior of each can body and elastically distortable by external air pressure, connecting means between said member and said valve to close the latter and retain the same in a closed condition while the degree of initial distortion is maintained, and means for restoring equilibrium of air pressures within and without each can body after appreciable further movement thereof in condition of mechanical release.

22. In a can testing machine, the combination, with means for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body means subsequently operable to release each of said can bodies in turn from its pressing and retaining mechanism, means providing a passage from the atmosphere to the interior of each seated can body, a valve in said passage, a hollow member open to the interior of each can body and including a diaphragm movable under influence of external air pressure, connecting means between said diaphragm and said valve to close the latter and retain the same in a closed condition until initial reverse movement of said diaphragm upon decrease of said pressure, and means for restoring equilibrium of air pressures within and without each can body after appreciable further movement thereof in condition of mechanical release.

23. In a can testing machine, the combination, with means for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to release each of said can bodies in turn from said pressing and retaining mechanism, means providing a passage from the atmosphere to the interior of each seated can body, a valve in said passage, means open to the interior of each can body and actuated by external air pressure to close said valve and retain the same in a closed condition, said last-mentioned means including a yieldingly compensative connection to dissipate impelling forces after initial application thereof, and means for restoring equilibrium of air pressures within and without each can body after appreciable further movement thereof in condition of mechanical release.

24. In a can testing machine, the combination, with means for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to release each of said can bodies in turn from said pressing and retaining mechanism, means providing a passage from the atmosphere to the interior of each seated can body, a valve in said passage, a hollow member open to the interior of each can body and elastically distortable by the external air pressure, connecting means between said member and said valve to close the latter and retain the same in a closed condition, said last-mentioned means including a yieldingly compensative connection to dissipate impelling forces after initial application thereof, and means for restoring equilibrium of air pressures within and without each can body after appreciable further movement thereof in condition of mechanical release.

25. In a can testing machine, the combination, with means for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to release each of said can bodies in turn from said pressing and retaining mechanism, means providing a passage from the atmosphere to the interior of each seated can body, a valve in said passage, a hollow member open to the interior of each can body and including a diaphragm movable under influence of external air pressure, connecting means between said diaphragm and said valve to close the latter and retain the same in a closed condition, said last-mentioned means including a yieldingly compensative connection to dissipate impelling forces after initial application thereof, and means for restoring equilibrium of air pressures within and without each can body after appreciable further movement thereof in condition of mechanical release.

26. In a can testing machine, the combination, with means for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to release each of said can bodies in turn from said pressing and retaining mechanism, means providing a passage from the atmosphere to the interior of each seated can body, a valve in said passage, means open to the interior of each can body and actuated by external air pressure to close said valve and retain the same in a closed condition, said last-mentioned means including a frictionally operative connection yielding to independent movement under forces in excess of those required to close said valve, whereby said valve-closing means are constantly in position to be instantly moved to open said valve upon decrease of said air pressure irrespective of the initial degree of said pressure, and means for restoring equilibrium of air pressures within and without each can body after appreciable further movement thereof in condition of mechanical release.

27. In a can testing machine, the combination, with means for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to release each of said can bodies in turn from said pressing and retaining mechanism, means providing a passage from the atmosphere to the interior of each seated can body, a valve in said passage, a hollow member open to the interior of each can body and elastically distortable by external air pressure, connecting means between said member and said valve to close the latter and retain the same in a closed condition, said last-mentioned means including a frictionally operative connection yielding to independent movement under forces in excess of those required to close said valve, whereby said valve-closing means are constantly in position to be instantly moved to open said valve upon decrease of said air pressure irrespective of the initial degree of said pressure, and means for restoring equilibrium of air pressures within and without each can body after appreciable further movement thereof in condition of mechanical release.

28. In a can testing machine, the combination, with means for progressively advancing a plurality of open-ended can bodies, said means including a series of yieldingly elastic seats and a corresponding series of mechanisms for pressing the open end of each can body against and retaining the same upon its seat, of means for exhausting air from the interior of each can body in turn at a fixed point in the path of movement of said bodies, means subsequently operable to release each of said can bodies in turn from its pressing and retaining mechanism, means providing a passage from the atmosphere to the interior of each seated can body, a valve in said passage, a hollow member open to the interior of each can body and including a diaphragm movable under influence of external air pressure, connecting means between said diaphragm and said valve to close the latter and retain the same in a closed condition, said last-mentioned means including a frictionally operative connection yielding to independent movement under forces in excess of those required to close said valve, whereby said valve-closing means are constantly in position to be instantly moved to open said valve upon decrease of said air pressure irrespective of the initial degree of said pressure, and means for restoring equilibrium of air pressures within and without each can body after appreciable further movement thereof in condition of mechanical release.

29. In a can testing machine, the combination, with means for progressively advancing a plurality of open-ended can bodies, said means including a series of yieldingly elastic seats and a corresponding series of mechanisms for pressing the open end of each can body against and retaining the same upon its seat, each of said pressing and retaining mechanisms comprising a pivoted lever spring-pressed in the direction of the can-end, of means for exhausting air from the interior of each can body in turn while under pressure of said lever, means subsequently operable to first engage said lever and swing the same against the action of its spring, then disengage said lever, and finally again engage the same to again release said can body, and means for restoring equilibrium of air pressures within and without each can body after appreciable further movement thereof in such condition of release.

30. In a can testing machine, the combination, with means for progressively advancing a plurality of open-ended can bodies, said means including a series of yieldingly elastic seats and a corresponding series of mechanisms for pressing the open end of each can body against and retaining the same upon its seat, each of said pressing and retaining mechanisms comprising a pivoted lever having one end spring-pressed in the direction of the can-end and against which it is adapted to impinge, of means for exhausting air from the interior of each can body in turn while under pressure of said lever, a cam track located in the path of movement of the other end of said lever to first deflect the same against the action of its spring, then free said lever, and finally again engage the same to again release said can body, and means for restoring equilibrium of air pressures within and without each can body after appreciable further movement thereof in such condition of release.

31. In a can testing machine, the combination, with means for progressively advancing a plurality of open-ended can bodies, said means including a series of yieldingly elastic seats and a corresponding series of mechanisms for pressing the open end of each can body against and retaining the same upon its seat, each of said pressing and retaining mechanisms comprising a spring-actuated lever having at one end thereof a presser-head adapted to impinge against the can-end and being provided with a roller at the other end thereof, of means for exhausting air from the interior of each can body in turn while under pressure of said lever, means located in the path of movement of said roller to first deflect said lever against the action of its spring, then free said lever, and finally again engage the same to again release said can body, and means for restoring equilibrium of air pressures within and without each can body after appreciable further movement thereof in such condition of release.

32. In a can testing machine, the combination, with a continuously advancing carrier having means thereon for hermetically seating open-ended can bodies, of a stationary member having two passages therethrough leading from one end thereof through suitable connections to a common source of air exhaustion, a member mounted on said stationary member and movable with said carrier, said movable member having passages therethrough each leading through suitable connections to the interior of a seated can body, part of said last-mentioned passages being in staggered arrangement and so located that they successively register alternately with one and the other port of said first-mentioned passages upon relative movement of said members.

33. In a can testing machine, the combination, with a revolving wheel mounted on a rotating shaft and carrying means for hermetically seating open-ended can bodies, of a stationary sleeve on said shaft having two passages therethrough leading through suitable connections to a common source of air exhaustion, a collar on said sleeve rotating with said wheel and having passages therethrough each leading through suitable connections to the interior of a seated can body, the interior ports of said collar-passages being in staggered arrangement and so located that they successively register alternately with one and the other exterior port of said sleeve-passages upon rotation of said collar.

In testimony of the foregoing, I have hereunto set my hand in the presence of two witnesses.

JULIUS BRENZINGER.

Witnesses:
 JAMES T. CONNOR,
 CHARLES H. WEEM.